United States Patent [19]

Moss, Jr. et al.

[11] Patent Number: 5,195,816
[45] Date of Patent: Mar. 23, 1993

[54] ADJUSTABLE AUXILIARY HEADLAMPS

[76] Inventors: Donald R. Moss, Jr., 614 6th St. #11, Racine, Wis. 53404-1154; George Spector, 233 Broadway Rm. 3815, New York, N.Y. 10007

[21] Appl. No.: 787,650
[22] Filed: Nov. 4, 1991
[51] Int. Cl.$^5$ .......................... B60Q 1/10; B60Q 11/00
[52] U.S. Cl. .......................................... 362/71; 362/37; 362/83.3; 362/420
[58] Field of Search ...................... 362/37, 41, 66, 71, 362/83.3, 286, 287, 269, 419, 420

[56] References Cited

U.S. PATENT DOCUMENTS

| 1,621,920 | 3/1927 | Berry et al. | 362/37 |
| 2,941,117 | 6/1960 | Dugle | 362/37 |
| 3,177,355 | 4/1965 | Trowbridge | 362/71 |
| 3,636,343 | 1/1972 | Martin | 362/71 |
| 3,846,627 | 11/1974 | Chastain | 362/71 |
| 4,276,581 | 6/1981 | Orii et al. | 362/71 |
| 4,968,896 | 11/1990 | Shibata et al. | 362/71 |
| 5,099,400 | 3/1992 | Lee | 362/37 |

FOREIGN PATENT DOCUMENTS

| 497726 | 9/1954 | Italy | 362/37 |
| 62-77253 | 4/1987 | Japan | 362/37 |

Primary Examiner—Richard R. Cole

[57] ABSTRACT

An auxiliary adjustable headlight assembly is provided for a motor vehicle which consists of a mechanism for vertically adjusting a pair of auxiliary headlights on an elongated rectangular plate that is mounted above the front bumper and between the conventional headlights of the motor vehicle. When the motor vehicle is traveling down/up an inclined road at night the auxiliary headlights can be vertically adjusted to shine upwardly/downwardly in the path of travel enabling the driver of the motor vehicle to better see the path of travel.

1 Claim, 1 Drawing Sheet

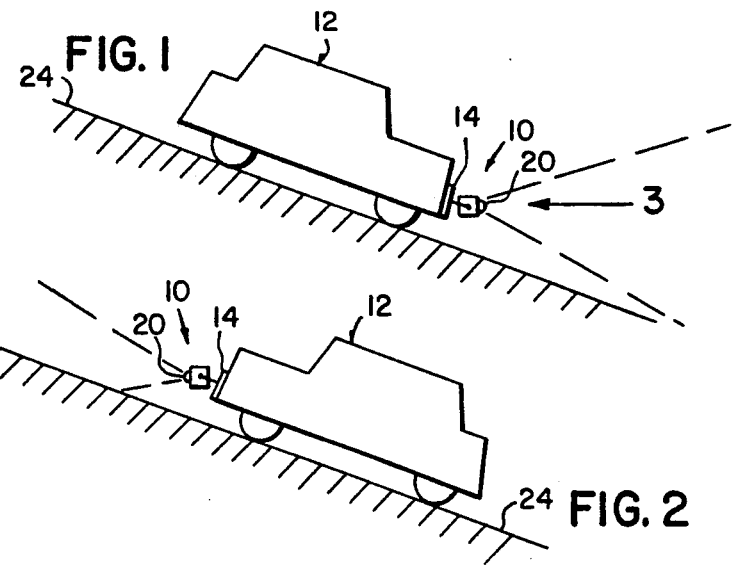
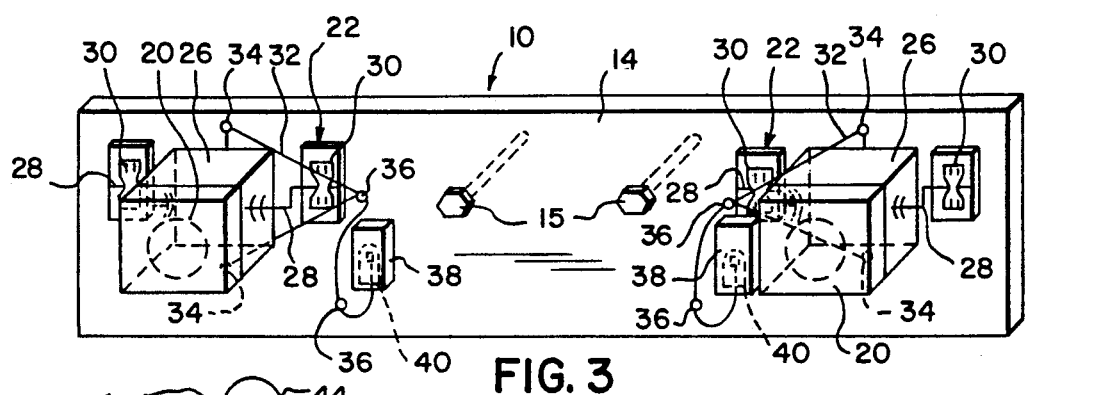
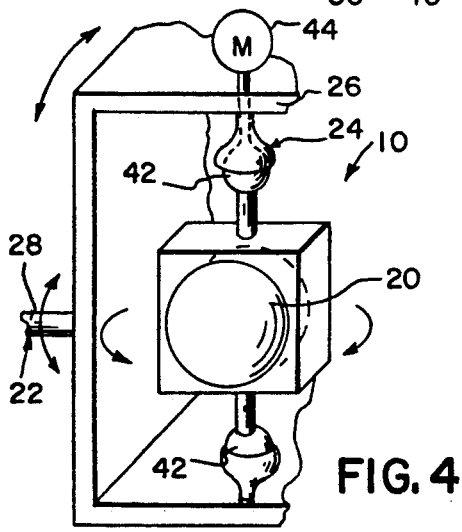
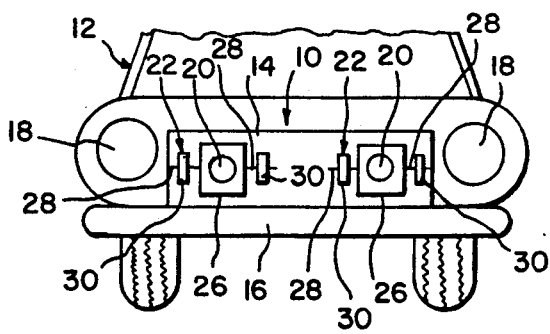

# ADJUSTABLE AUXILIARY HEADLAMPS

BACKGROUND OF THE INVENTION

The instant invention relates generally to automotive headlights and more specifically it relates to an auxiliary adjustable headlight assembly for a motor vehicle, which provides a mechanism which regulates the position of the auxiliary headlights, so that the driver can see the exact path of travel of the motor vehicle.

There are available various conventional automotive headlights which do not provide the novel improvements of the invention herein disclosed

SUMMARY OF THE INVENTION

A primary object of the present invention is to provide an auxiliary adjustable headlight assembly for a motor vehicle that will overcome the shortcomings of the prior art devices.

Another object is to provide an auxiliary adjustable headlight assembly for a motor vehicle that includes a mechanism which regulates the position of the auxiliary headlights, so that the driver can see the exact path of travel of the motor vehicle.

An additional object is to provide an auxiliary adjustable headlight assembly for a motor vehicle in which the vertical movement of the headlights are operated mechanically by gravity and the horizontal movement of the headlights are operated electrically by a motor which can be activated by a radio transmitter or the like.

A further object is to provide an auxiliary adjustable headlight assembly for a motor vehicle that is simple and easy to use.

A still further object is to provide an auxiliary adjustable headlight assembly for a motor vehicle that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a diagrammatic side view of a motor vehicle traveling down an inclined road with the invention installed thereon, so that the auxiliary headlights will shine upwardly in the path of travel.

FIG. 2 is a diagrammatic side view of the motor vehicle traveling up the inclined road with the invention installed thereon, so that the auxiliary headlights will shine downwardly in the path of travel.

FIG. 3 is a diagrammatic perspective view taken in direction of arrow 3 in FIG. 1 of the instant invention per se.

FIG. 3A is a schematic front view of the device mounted above the bumper and between the conventional headlights.

FIG. 4 is a diagrammatic perspective view of one of the auxiliary headlights showing a horizontal pivoting mechanism, which can be operated electronically, such as by a radio transmitter or the like.

DETAILED DESCRIPTION OF THE PREFERRED EMBODIMENTS

Turning now descriptively to the drawings, in which similar reference characters denote similar elements throughout the several views, the Figures illustrate an auxiliary adjustable headlight assembly 10 for a motor vehicle 12, which consists of an elongated rectangular plate 14 mounted by bolts 15 above the front bumper 16 and between the conventional headlights 18 of the motor vehicle 12. A pair of auxiliary headlights 20 are spaced apart in a left right relationship on the elongated rectangular plate 14. A mechanism 22 is for vertically adjusting the auxiliary headlights 20 on the elongated rectangular plate 14 with respect to the motor vehicle 12. Especially at night when the motor vehicle 12 is traveling down an inclined road 24, the auxiliary headlights 20 can be vertically adjusted to shine upwardly in the path of travel. When the motor vehicle 12 is traveling up an inclined road 24 the auxiliary headlights 20 can be vertically adjusted to shine downwardly in the path of travel, enabling the driver of the motor vehicle 12 to better see the path of travel.

The auxiliary adjustable headlight assembly 10 for the motor vehicle 12, further includes a mechanism 24 for horizontally adjusting the auxiliary headlights 20 on the elongated rectangular plate 14 with respect to the motor vehicle 12. Especially at night, when the motor vehicle 12 is traveling to the right on a road, the auxiliary headlights 20 can be horizontally adjusted to shine to the right in the path of travel. When the motor vehicle is traveling to the left on a road, the auxiliary headlights 20 can be horizontally adjusted to shine to the left in the path of travel, enabling the driver of the motor vehicle 12 to better see the path of travel.

The vertically adjusting mechanism 22 for each auxiliary headlight 20 includes a receptacle 26 for holding the auxiliary headlight 20. A pair of horizontal swing shafts 28 are each affixed to one side of the receptacle 26. A pair of brackets 30 are each for pivotally attaching one of the swing shafts 28 to the elongated rectangular plate 14, so that the receptacle 26 can be vertically adjusted thereto. Electric wiring 32 is connected to the auxiliary headlight 20 and extends from the rear of the receptacle 26. A pair of eyelets 34 are each affixed to the top and bottom of the receptacle 26 to guide the route of the wiring 32 from the receptacle 26. A pair of pulleys 36 are mounted to the elongated rectangular plate 14 for correcting the path of the wiring 32. A housing 38 is mounted to the elongated rectangular plate 14 for mechanical incline detection. A gravity feed control inclinometer 40 is carried in the housing 38 and is connected to the wiring 32 for indicating the angle of incline of the motor vehicle 12.

The horizontally adjusting mechanism 24 for each auxiliary headlight 20 includes a pair of vertical pivot ball and socket shafts 42, each affixed between the top and bottom of the auxiliary headlight 20 and the receptacle 26. An electric motor 44 is connected to one of the pivot ball and socket shafts 42. When the electric motor 44 is activated the auxiliary headlight 20 can be horizontally adjusted thereto. The electric motor 44 can be operated electronically, such as by a radio transmitter or the like.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

For example although the auxiliary lights are shown in the drawings as being mounted on plate 14, the auxiliary lights maybe mounted at any appropriate location such as the roll bar of "Jeeps", etc.

What is claimed is:

1. An auxiliary adjustable headlight assembly for a motor vehicle with a front bumper and conventional headlights which comprises:
   a) an elongated rectangular plate mounted above said front bumper and between said conventional headlights of the motor vehicle;
   b) a pair of auxiliary headlights spaced apart in a left right relationship on said elongated rectangular plate; and
   c) means for vertically adjusting said auxiliary headlights on said elongated rectangular plate with respect to the path of travel of said motor vehicle, so that especially at night when the motor vehicle is traveling down an inclined road, said auxiliary headlights can be vertically adjusted to shine upwardly in said path of travel and when the motor vehicle is traveling up an inclined road said auxiliary headlights can be vertically adjusted to shine downwardly in the path of travel, enabling better sight of said path of travel; wherein said vertically adjusting means for each said auxiliary headlight includes:
   d) a receptacle having a rear, top and bottom for holding said auxiliary headlight;
   e) a pair of horizontal swing shafts, each affixed to one side of said receptacle;
   f) a pair of brackets, each for pivotally attaching one of said swing shafts to said elongated rectangular plate, so that said receptacle can be vertically adjusted thereto;
   g) electrical wiring connected to said auxiliary headlight and extending from the rear of said receptacle;
   h) a pair of eyelets, each affixed to the top and bottom of said receptacle to guide said wiring from said receptacle;
   i) a pair of pulleys mounted to said elongated rectangular plate for adjusting said wiring;
   j) a housing mounted to said elongated rectangular plate for mechanical incline detection; and
   k) a gravity feed control inclinometer for indicating inclination of said motor vehicle carrier in said housing and connected to the wiring for indicating said inclination.

* * * * *